(12) United States Patent
Fong et al.

(10) Patent No.: US 6,493,328 B2
(45) Date of Patent: Dec. 10, 2002

(54) ACTIVE SET MANAGEMENT IN CELLULAR WIRELESS NETWORK THAT SUPPORTS HIGH DATA RATE FORWARD LINK TRANSMISSIONS

(76) Inventors: Mo-Han Fong, 1578 Bay Rd., L'Orignal Prov., Ontario (CA), K0B 1K0; Geng Wu, 3401 Spring Mountain Dr., Plano, TX (US) 75025

(*) Notice: Subject to any disclaimer, the term of this patent is extended or adjusted under 35 U.S.C. 154(b) by 11 days.

(21) Appl. No.: 09/833,837

(22) Filed: Apr. 12, 2001

(65) Prior Publication Data

US 2001/0038616 A1 Nov. 8, 2001

Related U.S. Application Data

(60) Provisional application No. 60/196,635, filed on Apr. 12, 2000, and provisional application No. 60/196,636, filed on Apr. 12, 2000.

(51) Int. Cl.$^7$ .............................. H04Q 7/00; H04B 1/00
(52) U.S. Cl. ...................... 370/329; 370/389; 455/69; 455/561
(58) Field of Search ................................ 370/328, 329, 370/209, 320, 332, 331, 342, 340, 341, 334, 335; 455/422, 436, 439, 437, 438, 440, 442, 452, 443, 62, 560, 561, 562, 67.4

(56) References Cited

U.S. PATENT DOCUMENTS 6,069,871 A * 5/2000 Sharma et al.
6,151,512 A * 11/2000 Chheda et al.
6,160,999 A * 12/2000 Chheda et al.

\* cited by examiner

Primary Examiner—William Luther

(57) ABSTRACT

A high data rate active set of base stations services high data rate forward link transmissions for a mobile station. Membership of the high data rate active set of base stations is determined via interaction with legacy standard operations that define a legacy standard active set of base stations for the mobile station. The high data rate forward link active set of base stations may be a subset of the legacy standard active set of base stations. The high data rate forward link active set of base stations may correspond directly to a reduced active set of base stations according to the legacy standard operations, e.g., reduced active set. According to another operation, access to newly added base stations to the high data rate forward link active set of base stations is precluded until the newly added base station is available to support forward link transmissions.

21 Claims, 12 Drawing Sheets

ACTIVE SET MANAGEMENT IN CELLULAR WIRELESS NETWORK THAT SUPPORTS HIGH DATA RATE FORWARD LINK TRANSMISSIONS

CROSS-REFERENCE TO RELATED APPLICATION

The present application claims priority pursuant to 35 U.S.C. Sec 119(e) to U.S. Provisional Application Ser. No. 60/196,635, filed Apr. 12, 2000, and to U.S. Provisional Application Ser. No. 60/196,636, filed Apr. 12, 2000, both of which are hereby incorporated by reference in their entirety.

BACKGROUND

1. Technical Field

The present invention relates generally to cellular wireless networks; and more particularly to the servicing of high data rate packetized data communications within such cellular wireless networks.

2. Related Art

Wireless networks are well known. Cellular wireless networks support wireless communication services in many populated areas of the world. While cellular wireless networks were initially constructed to service circuit-switched voice communications, they are now called upon to support packet-switched data communications as well.

The transmission of packetized data communications within a wireless network places different demands on networks than does the transmission of voice communications. Voice communications require a sustained bandwidth with minimum signal-to-noise ratio (SNR) and continuity requirements. Data communications, on the other hand, typically are latency tolerant but have higher total throughput requirements. Conventional circuit-switched wireless networks were designed to support the well-known voice communication requirements. Thus, wireless networks (as well as conventional circuit switched telephone networks) have been adapted to service data communications, with such adaptation providing mixed results. Thus, future wired and wireless networks will likely be fully packet switched.

Because packet data transmissions typically employ a greater bandwidth on the forward link than they do on the reverse link, various standards have been promulgated which focus on high data rate forward link transmissions. These standards include, for example, the high data rate downlink packet access (HSDPA) standard. The HSDPA is a backward compatible standard that is compatible with the UMTS standard, which is widely used in Europe. The 1xEV-DO and 1xEV-DV standards will also provide high data rate forward link transmissions. These standards will be backward compatible with the 1xRTT standard, which is a member of cdma2000 family of standards. Note that the HSDPA and 1xEV-DO standards typically employ a semi-distributed network architecture.

However, while these high packet data systems provide or high data rate forward link transmissions, they lack the ability to support non-interrupted high data rate transmissions, such as streaming operations. This shortcoming is caused by various problems, including the methodology for selecting cells to service the forward link transmissions as well as the manner in which data is managed within the wireless network.

Thus, there exists a need in the art for a system and method of operation that will support high data rate forward link transmissions capable of supporting non-interrupted transmissions.

SUMMARY OF THE INVENTION

In order to overcome the above cited shortcomings of the prior systems, among other shortcomings, a method for operating a cellular wireless network to service high data rate forward link transmissions for a mobile station actively manages the active set of base stations serving high data rate forward link transmissions. As a first operation according to the present invention, interaction with legacy standard operations supported by the cellular wireless network to determine a legacy standard active set of base stations for the mobile station.

Then, a high data rate forward link active set of base stations is determined based upon the legacy standard active set of base stations. Next, the method includes transmitting blocks of packetized forward link data to the base stations of the high data rate forward link active set of base stations. With the packetized forward link data at the base stations, high data rate forward link data is transmitted from only one base station of the high data rate forward link active set of base stations to the mobile station.

According to one aspect of the present invention, the high data rate forward link active set of base stations is a subset of the legacy standard active set of base stations for the mobile station. In one embodiment, the legacy standard operations are code division multiple access operations and the high data rate forward link operates substantially according to a high data rate standard, e.g., the 1xRTT standard and the 1xEV-DO standard, respectively. In such case, the high data rate forward link active set of base stations may correspond directly to a reduced active set of base stations according to the legacy standard operations, e.g., reduced active set.

According to another aspect of the present invention, access to newly added base stations to the high data rate forward link active set of base stations is precluded until the newly added base station is available to support forward link transmissions. According to this aspect, packetized data intended for the mobile station is received at a base station controller. An active set of base stations for servicing the mobile station is determined, wherein any of the active set of base stations may be selected to transmit the packetized data to the mobile station. Initially, transmissions of the packetized data to the mobile station are serviced by a first base station of the plurality of base stations of the active set of base stations.

When a new base station is added to the active set of base stations, however, access must be limited until the base station is ready. Thus, the mobile station's access to the new base station is delayed to allow provisioning of resources at the new base station. According to one technique, the resources at the new base station are first provisioned, then the mobile station is notified that the new base station is in the active set of base stations. According to another technique, the mobile station is directed to initiate a delay timer for a delay timer period such that it will not attempt to access the new base station until the delay timer has expired. Then, after notifying the mobile station to initiate the delay timer, resources at the new base station are provisioned.

A base station controller and/or other cellular network elements that service high data rate forward link transmissions for a mobile station may perform these operations. Further, these operations may be embodied as a plurality of software operations performed by at least one component of cellular wireless network.

By defining the high data rate forward link active set of base stations via interaction with the legacy standard operations, significant operational resources are conserved. Further, by delaying access to a newly added base station until the base station is ready to provide forward link transmissions, high data rate real-time communications may be supported, e.g., streaming audio, streaming video, etc.

Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
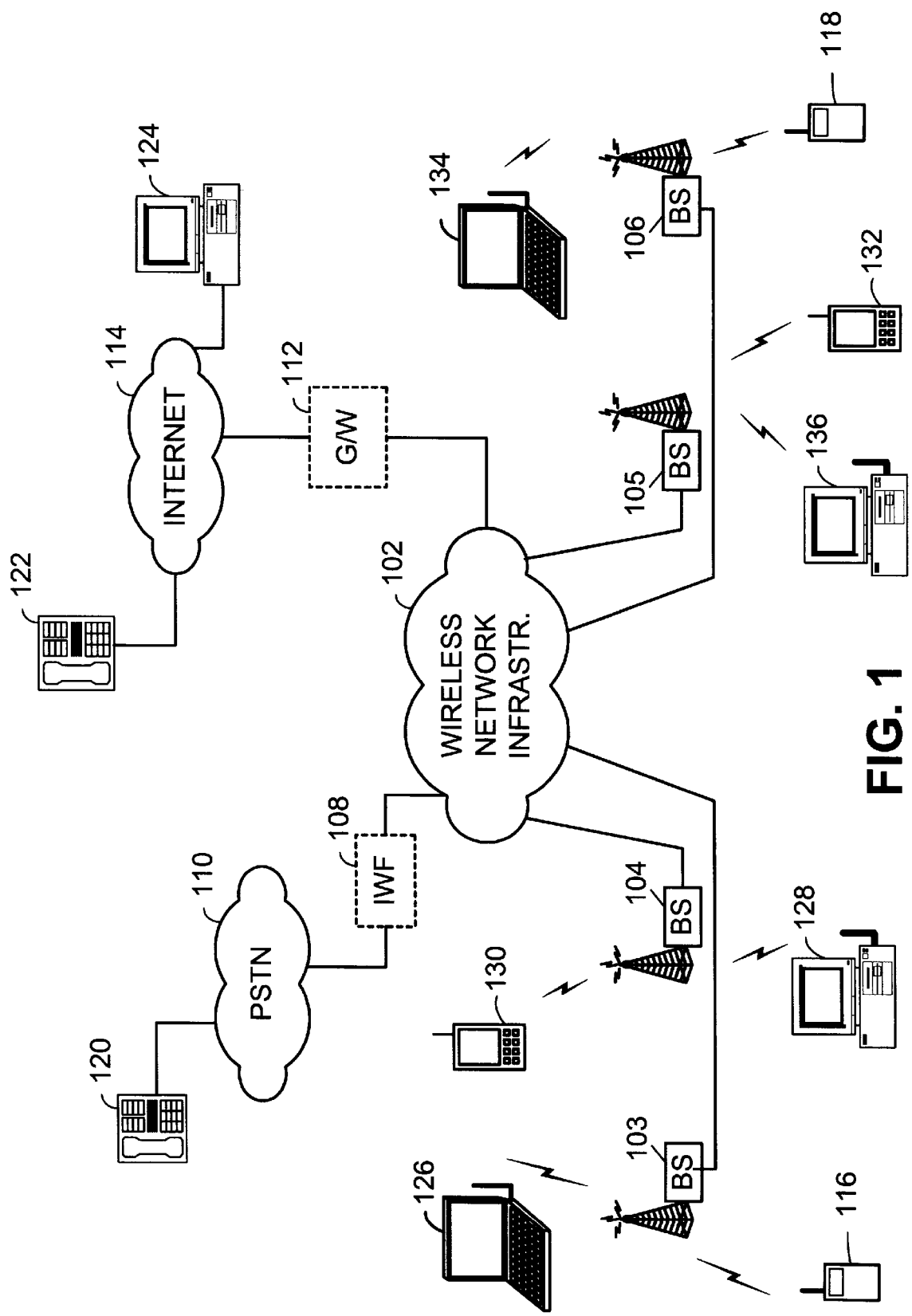
FIG. 1 is a system diagram illustrating a portion of a cellular wireless network constructed according to the present invention.

FIG. 1 is a system diagram illustrating a portion of a cellular wireless network constructed according to the present invention. The cellular wireless network includes a wireless network infrastructure 102 and base stations 103, 104, 105, and 106. The wireless network infrastructure 102 couples to the Internet 114. The wireless network infrastructure 102 also couples to the Public Switched Telephone Network (PSTN) 110. In one embodiment of the present invention, the network infrastructure 102 is circuit switched, couples directly to the PSTN 110, and couples to the Internet 114 via a gateway (G/W) 112. In another embodiment of the present invention, the network infrastructure is packet switched, couples directly to the Internet 114, and couples to the PSTN via an interworking function (IWF) 108.

A conventional voice terminal 120 couples to the PSTN 110. A VOIP terminal 122 and a personal computer 124 couple to the Internet 114. Mobile stations 116, 118, 126, 128, 130, 132, 134, and 136 wirelessly couple to the wireless network via wireless links with the base stations 103–106. As illustrated, mobile stations may include cellular telephones 116 and 118, laptop computers 126 and 134, desktop computers 128 and 136, and data terminals 130 and 132. However, the wireless network supports communications with other types of mobile stations as well.

Each of the base stations 103–106 services a cell/set of sectors within which it supports wireless communications. Wireless links that include both forward link components and reverse link components support wireless communications between the base stations and their serviced mobile stations. These wireless links support both data communications, VoIP and other multimedia communications. The teachings of the present invention may be applied equally to any type of packetized communication.

The cellular system operates according to a CDMA standard that has been modified according to the present invention, e.g., IS-95, IS-2000, W-CDMA, or another CDMA standard that has been modified according to the operations described herein. The cellular system also operates according to a high data rate air interface standard such as the 1xEV data only (DO), or the 1xEV data and voice (DV), or the 3GPP HSD standard that operates according to the present invention. In the description of the present invention, the CDMA legacy operations are referred to as "legacy standard operations/legacy standards" while the high data rate data operations are generally referred to as the "high data rate operations/high data rate standards". Generally speaking, legacy operations support both forward link and reverse link voice and data at similar data rate while high data rate operations support a much higher data rate forward link.

The cellular system supports both legacy standard operations and high data rate operations. According to the high data rate operations, each of the base stations supports one or more high data rate forward channel(s) (F-CH). A F-CH is a spread-spectrum time multiplexed channel that may service only a single mobile station at any given time. One example of the F-CH, is described in detail in the TR45 cdma2000 High Rate Packet Data Air Interface Specification that was published as TIA/EIA/IS856 by the TIA.

According to one aspect of the present invention, legacy standard operations are employed to define an active set of base stations for each of the mobile stations 116, 118, 126, 128, 130, 132, 134, and 136. Then, this legacy standard active set of base stations is used to determine a high data rate forward link active set of base stations. According to one embodiment, a reduced set of the legacy standard active set of base stations is used directly to define the high data rate forward link active set of base stations.

According to another aspect of the present invention, as the high data rate forward link active set of base stations changes by adding a base station thereto, access to the new base station(s) is limited. Such limitation on access to the new base station(s) is provided to allow forward link data that may be transmitted from the new base station(s) to be downloaded to the new base station(s) and for resources to be allocated at the new base station(s). In one limitation operation, the wireless network infrastructure does not notify a serviced mobile station of the change in its high data rate forward link active set of base stations until provisioning of resources has been completed and a corresponding transmit buffer has been filled. In another operation, upon the addition of the new base station(s) to the mobile station's active set of high data rate forward link active set of base stations, the mobile station sets a timer and does not access the new base station(s) until the timer expires. Of course various modifications of these techniques may be employed.

Figure 2:
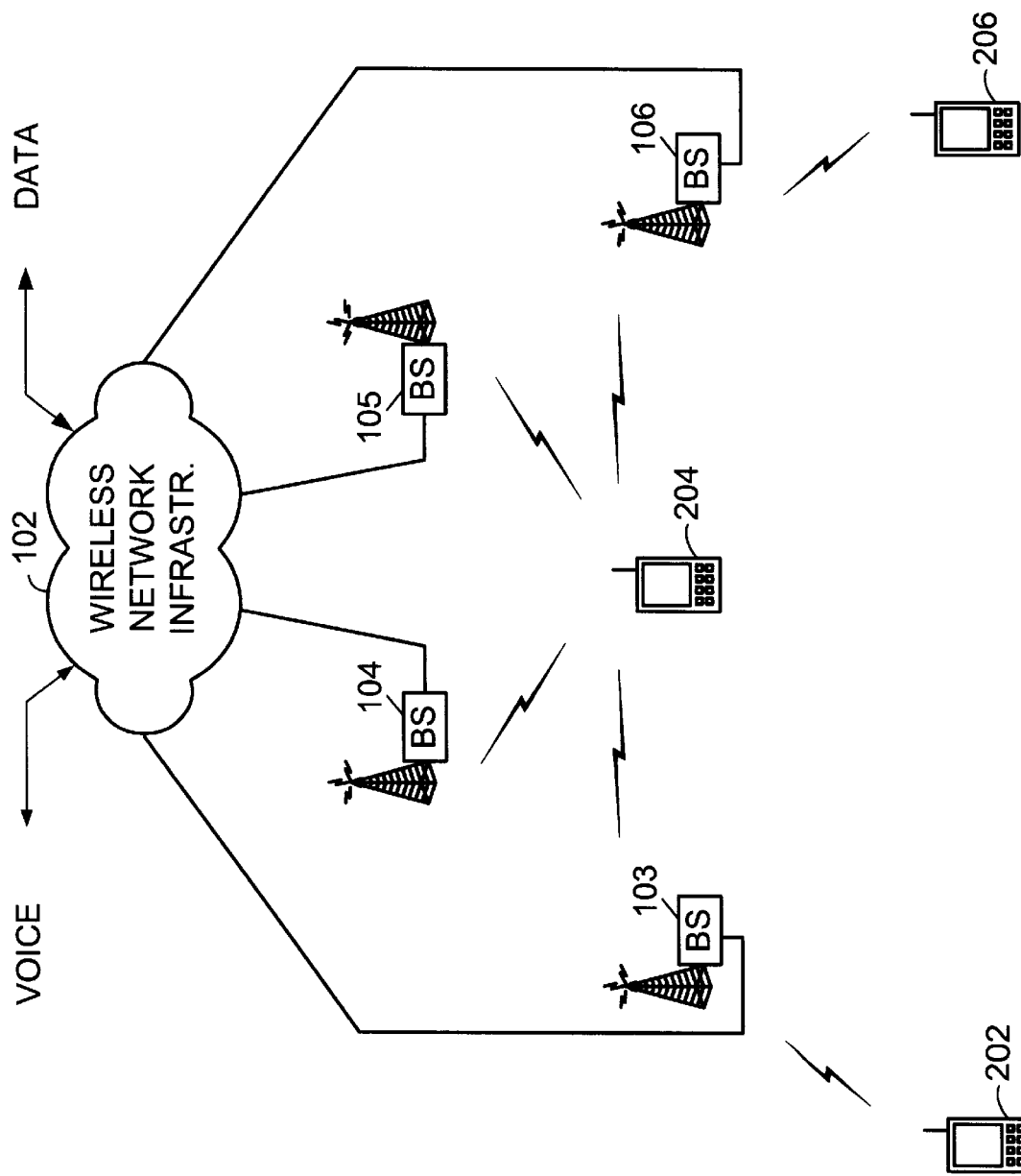
FIG. 2 is a system diagram illustrating another portion of the cellular wireless network constructed according to the present invention.

FIG. 2 is a system diagram illustrating another portion of the cellular wireless network constructed according to the present invention. As shown in FIG. 2, the wireless network infrastructure 102 interfaces to both voice and data networks. The voice and data networks are not shown in detail here for simplicity in description. Base stations 103, 104, 105, and 106 each support wireless communications with a mobile station as the mobile station moves from position 202 through position 204 and into position 206.

According to a first aspect of the present invention, the wireless network supports legacy standard operations. These legacy standard operations may include UMTS, IS-95A, IS-95B, CDMA 2000, 1xRTT, or other standard operations. In these legacy standard operations, an active set of base stations is determined for each mobile station operating within the coverage area of the cellular wireless network.

As a particular example of such operations, the wireless network determines an active set of base stations that services forward and reverse wireless links with the mobile station according to legacy standard operations. In the example of FIG. 2, with the mobile station at position 202, base station 103 and, base station 104 reside in the active set of base stations for the mobile station 202 according to the legacy standard operations. Further, with the mobile station at position 204, base stations 103, 104, 105, and 106 are in the active set of base stations for the mobile station according to the legacy standard operations. Finally, with the mobile station at position 206, base stations 105 and 106 are in the active set of base stations for the mobile station as defined by the legacy standard operations.

According to the present invention, a high data rate forward link active set of base stations is defined for the mobile station at all times that high data rate data forward link transmissions are supported for the mobile station. This high data rate forward link active set of base stations is based upon the active set of base stations for the mobile stations supported according to the legacy standard operations. Thus for example, with the mobile station at position 202, the high data rate forward link active set of base stations is based upon the active set of base stations according to the legacy standard operations that was defined to include base station 103 and base station 104. With the mobile station at position 202, the high data rate data forward link active set of base stations may include both base station 103 and base station 104, which are both within the active set of base stations for the mobile station according to the legacy standard operations. However, the high data rate forward link active set of base stations may include a single base station 103 (or base station 104) that is within a subset of the active set of base stations according to the legacy standard operations.

With the mobile station at position 204 and having base stations 103, 104, 105, and 106 in its active set of base stations according to legacy standard operations, a greater number of base stations for defining the high data rate forward link active set of base stations is available. In such case, the high data rate forward link active set of base stations for mobile station while at position 204 may include base station 104 and base station 106, for example. In determining the high data rate forward link active set of base stations, the active set of base stations according to the legacy standard operations is one basis. An additional basis will be the carrier to interference ratio for each of the base stations 103, 104, 105, and 106 currently in the active set according to the legacy standard operations. Therefore, some all or a portion of base stations 103, 104, 105, and 106 may make up the high data rate forward link active set of base stations for the mobile station while at position 204. In a particular example, the high data rate forward link active set of base stations includes base stations 104 and 106 while the mobile station is at position 204.

In an alternate embodiment of the present invention, the high data rate forward link active set of base stations corresponds directly to a reduced active set of base stations defined according to the legacy standard. In the CDMA 2000 1xRTT standard, for example, a reduced active set of base stations is defined that will service supplemental channels for the mobile station. While each of the base stations 103, 104, 105, and 106 will support reverse link operations for the mobile station at position 204, the reduced active set of base stations would include only base stations 104 and 106. In such case, the high data rate forward link active set of base stations would include base station 104 and base station 106 to conform exactly to the reduced active set of base stations defined by the legacy standard.

With the mobile station at position 206, legacy standard operations define an active set of base stations that includes base station 105 and base station 106. In such case, the high data rate forward link active set of base stations may include both base stations 105 and base station 106 or may include either of base station 105 and 106. According to the aspect of the present invention that includes a reduced active set definition by the legacy standard operations, the high data rate forward link active set of base stations would correspond to the reduced active set of base stations defined by the legacy standard operations.

By having a high data rate forward link active set correspond to the legacy standard active set of base stations, significant overhead is avoided for operation according to the high data rate forward link standard. As will be further described with reference to FIG. 5, interaction between the legacy standard operations and the high data rate operations is required in the definition of the high data rate forward link active set. This interaction places a relatively small processing load on the components of the cellular wireless network as compared to the separate definition of a high data rate forward link active set of base stations.

Figure 3A:
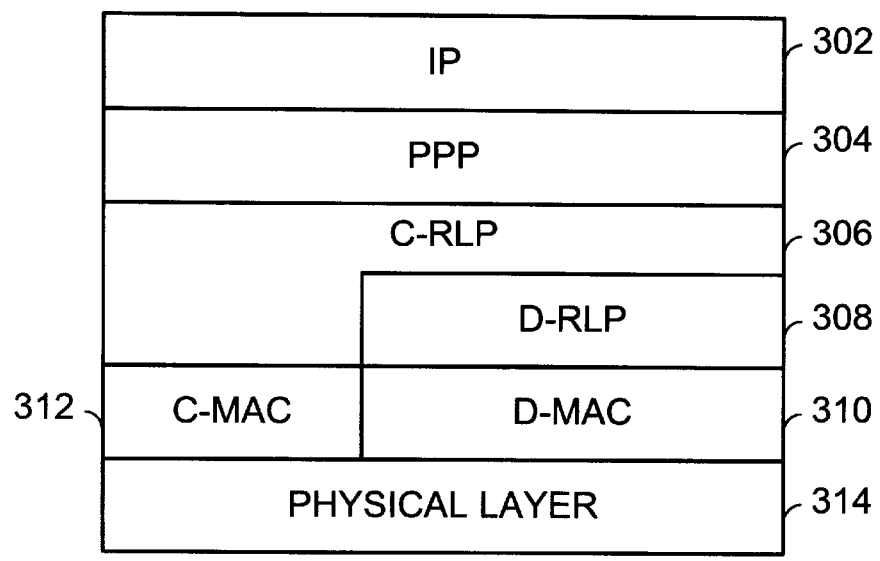
FIG. 3A is a block diagram illustrating a typical wireless data communication protocol stack supported according to the present invention.

FIG. 3A is a block diagram illustrating a typical wireless data communication stack supported according to the present invention. This protocol stack includes an Internet Protocol (IP) layer 302, a Point-to-Point Protocol (PPP) layer 304, and additional layers residing below the PPP 304 layer. Immediately below the PPP layer 304, is a Radio Link Protocol (RLP) layer. The RLP layer includes a centralized RLP component (C-RLP) 306 and a distributed RLP component (DRLP) 308. Supporting the high data rate forward link transmissions, the a centralized and distributed RLP structure is required to adequately service transmissions on the high data rate forward link.

Residing below the RLP layer is a Media Access Control (MAC) layer. The MAC layer includes a centralized MAC component (C-MAC) 312 and a distributed MAC component (D-MAC) 310. Residing below the MAC layer is the physical layer 314. The components of the ISO protocol stack supported according to the present invention illustrated in FIG. 3A are generally known. Thus, these components will not be described other than to expand upon the principles of the present invention.

Figure 3B:
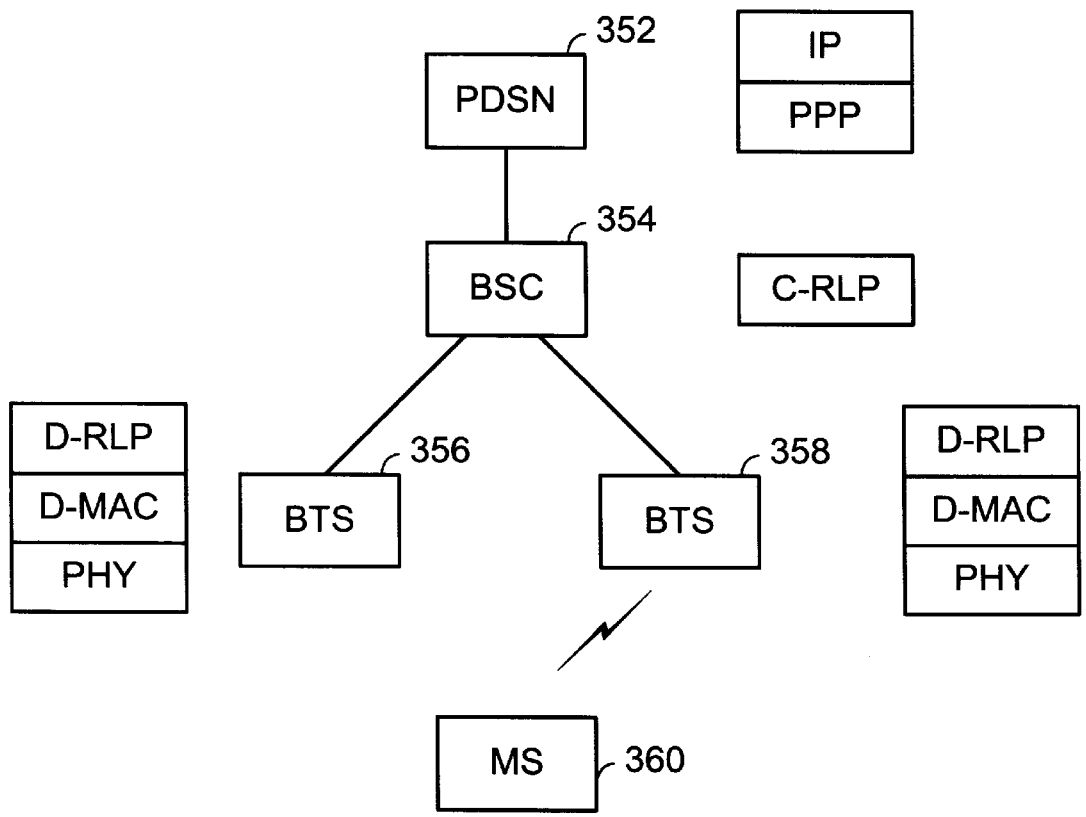
FIG. 3B is a block diagram illustrating portions of the cellular wireless network and the manner in which the components of a typical wireless communication protocol stack are serviced according to the present invention.

FIG. 3B is a block diagram illustrating portions of the cellular wireless network and the manner in which the components of a typical wireless communication protocol stack are serviced according to the present invention. As shown in FIG. 3B, some of the protocol components shown in FIG. 3A are distributed among a plurality of cellular wireless network components. A packet data serving node (PDSN) 352 supports the IP 302 and PPP 304 layers. A base station controller (BSC) 354 supports the C-RLP 306 component of the RLP layer. Base station Transceiving Subsystems (BTS) 356 and 358, each associated with the other components of a respective base station, support the D-RLP 308 component of the RLP layer, the D-MAC 310 component of the MAC layer, and the physical layer 314.

The term "base station" was used with reference to FIGS. 1 and 2. Each base station includes a BTS, a tower, and an antenna. The BTS includes the electronic components of the base station. Thus, in some subsequent description, the term BTS is used in conjunction with the description of some operations, protocol layers, etc. The reader should understand that each BTS corresponds to a particular base station and the description herein should be read with this in mind.

According to the present invention, the high data rate forward link active set of base stations includes BTSs 356 and 358. Thus, either of BTSs 356 or 358 may transmit high data rate forward link data to mobile station 360 at any time. According to the fast cell switching operations of the present invention, the active BTS, BTS 356 or BTS 358, may be changed at any given time. Thus, in order to avoid loss of data, a D-RLP transmit buffer present in BTS 356 and a D-RLP transmit buffer contained in BTS 358 must both contain a current set of data for transmission to mobile station 360. To prevent data loss, a copy of the C-RLP transmit buffer is substantially maintained in each D-RLP transmit buffer at any given time. Therefore, when the active transmitting BTS is changed, a complete set of transmit buffer contents is available for transmission to the mobile station 360.

When a new BTS/base station is added to the high data rate forward link active set of base stations, the D-RLP buffer in the newly added base station does not include a copy of the contents of the C-RLP transmit buffer nor are resources in the newly added base station available for servicing high speed forward link transmissions to the mobile station 360. Thus, the newly added BTS is precluded for service use until the resources are added and the D-RLP buffer of the BTS is filled.

Figure 4:
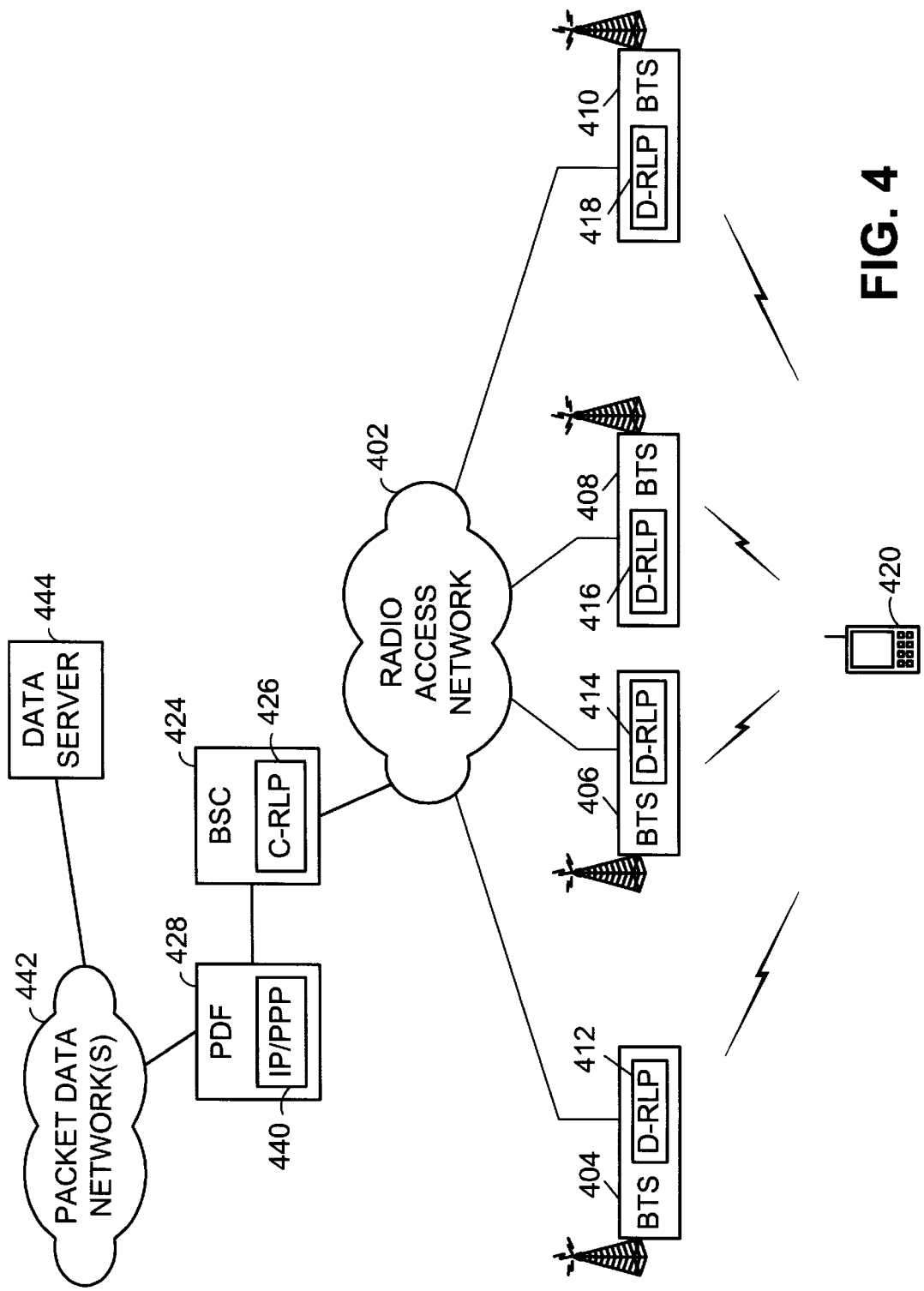
FIG. 4 is a system diagram illustrating another portion of the cellular wireless network constructed according to the present invention that is used to illustrate the manner in which high data rate forward link transmissions are serviced.

FIG. 4 is a system diagram illustrating another portion of the cellular wireless network constructed according to the present invention that is used to illustrate the manner in which high data rate forward link transmissions are serviced. FIG. 4 is used to illustrate the structure of the cellular wireless network as it relates to the addition of base stations/BTSs to the high data rate forward link active set of base stations. In the example of FIG. 4, BTS 404, BTS 406, BTS 408 and BTS 410 are components of base stations currently in the active set of base stations for mobile station 420 supported according to legacy standard operations. These BTSs couple to a radio access network 402. Coupled to the radio access network 402 is base station controller 424 which couples to packet data networks 442 via packet data serving node (PDSN) 428.

An example of an operation supported according to the present invention, a data server 444, coupled to packet data network 442, provides high speed data to mobile station 420. These forward link transmissions are serviced according to a high data rate forward link standard and include a wireless forward link from one of base stations 404, 406, 408, and 410. The forward link data provide is in the form of a streaming data communication (e.g., streaming video data, streaming audio data, etc.). This streaming data is provided to the mobile station 420 across a high data rate forward link according to the present invention.

During a first period of operation, BTSs 404 and 406 correspond to base stations in the high data rate forward link active set of base stations. Thus, at any time, high data rate forward link transmissions may be transmitted to mobile station 420 via either BTS 404 or BTS 406. In such case, D-RLP 412 transmit buffer present in BTS 404 and D-RLP 414 transmit buffer present in BTS 406 are managed by the CRLP 426 in base station controller 424. In performing this management, a substantially complete copy of a C-RLP transmit buffer contained in BSC 424 is maintained in each D-RLP transmit buffer. The C-RLP buffer interacts with IP/PPP buffers in the PDSN 428 to service the high data rate forward link data transmissions to mobile station 420.

At a subsequent time, the high data rate forward link active set of base stations is altered to include BTS 404, BTS 406, and BTS 408. However, with BTS 408 being added to the high data rate forward link active set of base stations, a D-RLP 416 transmit buffer contained in BTS 408 is empty and does not include a current copy of the C-RLP 426 transmit buffer nor are forward link resources in BTS 408 allocated for servicing a high data rate forward link to mobile station 420.

Thus, according to the present invention, the BTS 408 is not available for servicing high data rate forward link transmissions to mobile station 420 until the D-RLP 416 transmit buffer is filled with forward link data and BTS 408 resources for servicing the forward link are allocated. As will be further described with reference to FIGS. 7 and 8, the manner in which access to BTS 408 is limited may be implemented in various manners.

A similar operation occurs when the high data rate forward link active set of base stations is altered to include base station/BTS 410. Further, the manner in which any of these BTSs/base stations 404, 406, 408, and 410 is added or removed from the high data rate forward link active set of base stations involves interaction between the high data rate forward link operations and the legacy standard operation supported by the cellular wireless network.

Figure 5:
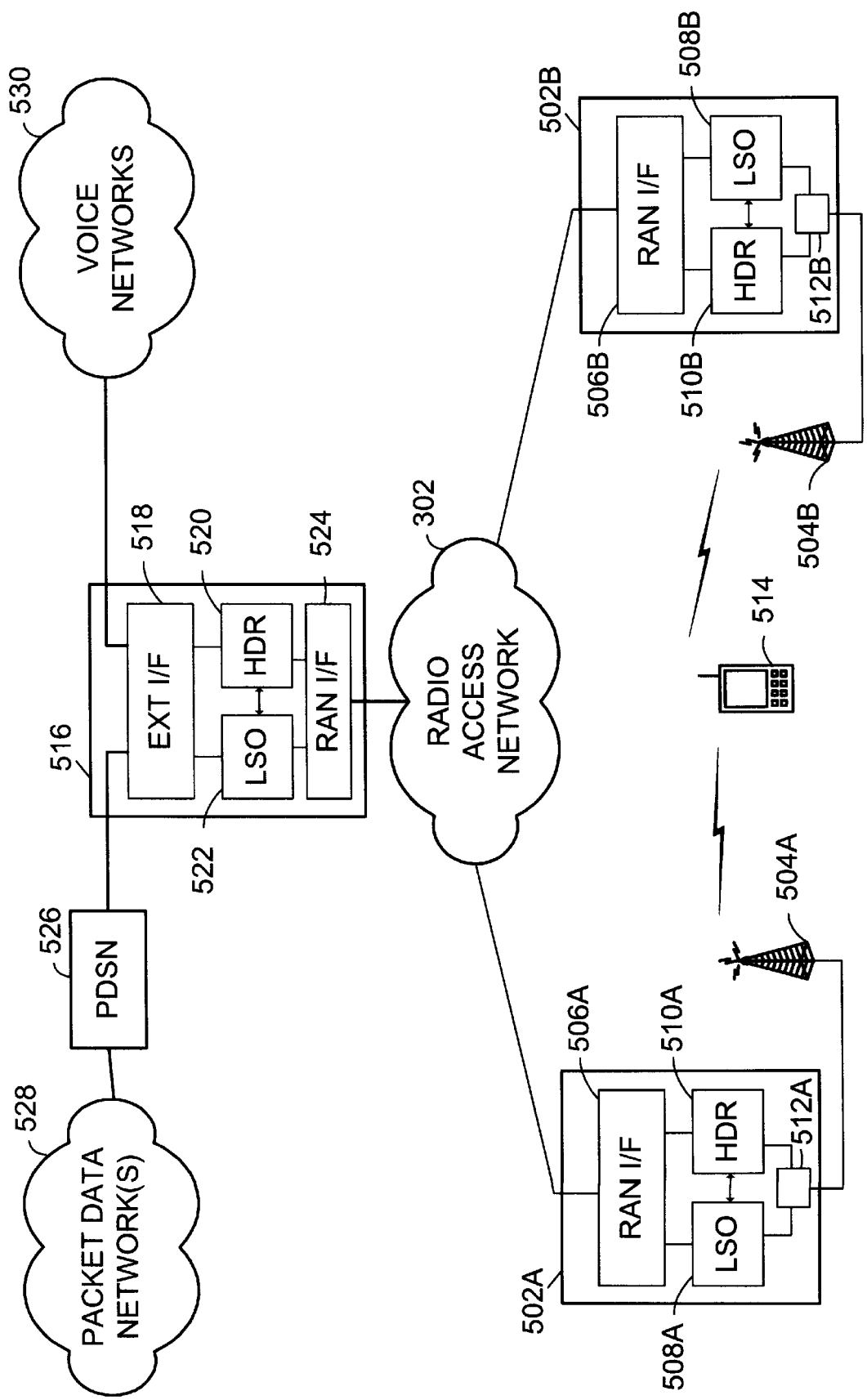
FIG. 5 is a system diagram illustrating another portion of the cellular wireless network constructed according to the present invention and the manner in which the active set of high data rate base stations is determined and serviced for a mobile station.

FIG. 5 is a system diagram illustrating another portion of the cellular wireless network constructed according to the present invention and the manner in which the active set of high data rate base stations is determined and serviced for a mobile station. FIG. 5 illustrates a radio access network and its connection to BTS 502A, BTS 502B, and BSC 516. These devices service both high data rate forward link communication as well as legacy standard communications. Base station controller 516 couples to packet data networks 528 via PDSN 526 and also couples directly to voice networks 530.

The base station controller 516 couples to the PDSN 526 and voice networks 530 via an external interface 518. The BSC 516 also couples to the radio access network 302 via a radio access network interface 524. The base station controller supports legacy standard operations 522 and high data rate forward link operations 520. These operations are shown as block components of BSC 516. However, as one skilled in the art will easily understand, these operations are generally a combination of hardware and software operations and are not distinct functional components of a base station controller. This principle will be further illustrated with reference to FIG. 11.

Each of the BTSs 502A and 502B includes a radio access network interface 506A and 506B, respectively. Further, each of the BTSs 502A and 502B supports legacy standard operations 508A and 508B, respectively, and high data rate forward link operations 510A and 510B, respectively. Both the high data rate operations and legacy standard operations use resources of the BTSs 502A and 502B. As the reader will understand the manner in which these operations are supported could be embodied in various combinations of hardware and software operations. Thus, thee legacy standard operations and high data rate forward link operations are shown coupled via couplers 512A and 512B for sharing of towers and antennas 504A and 504B, respectively.

Both of these BTSs 502A and 502B support communications with mobile station 514. In order to support interaction between legacy standard operations and high data rate forward link operations, the BTSs, 502A and 502B, and the BSC 516 support interaction between legacy standard operations and high data rate forward link operations. This interaction is shown generally as arrowed line between LSO 522 and HSO 520 in BSC 516, for example. However, as the reader will readily understand, the interaction between the legacy standard operations and the high data rate forward link operations is typically one embodied via software operations, etc., data passing, command interaction, etc.

Figure 6:
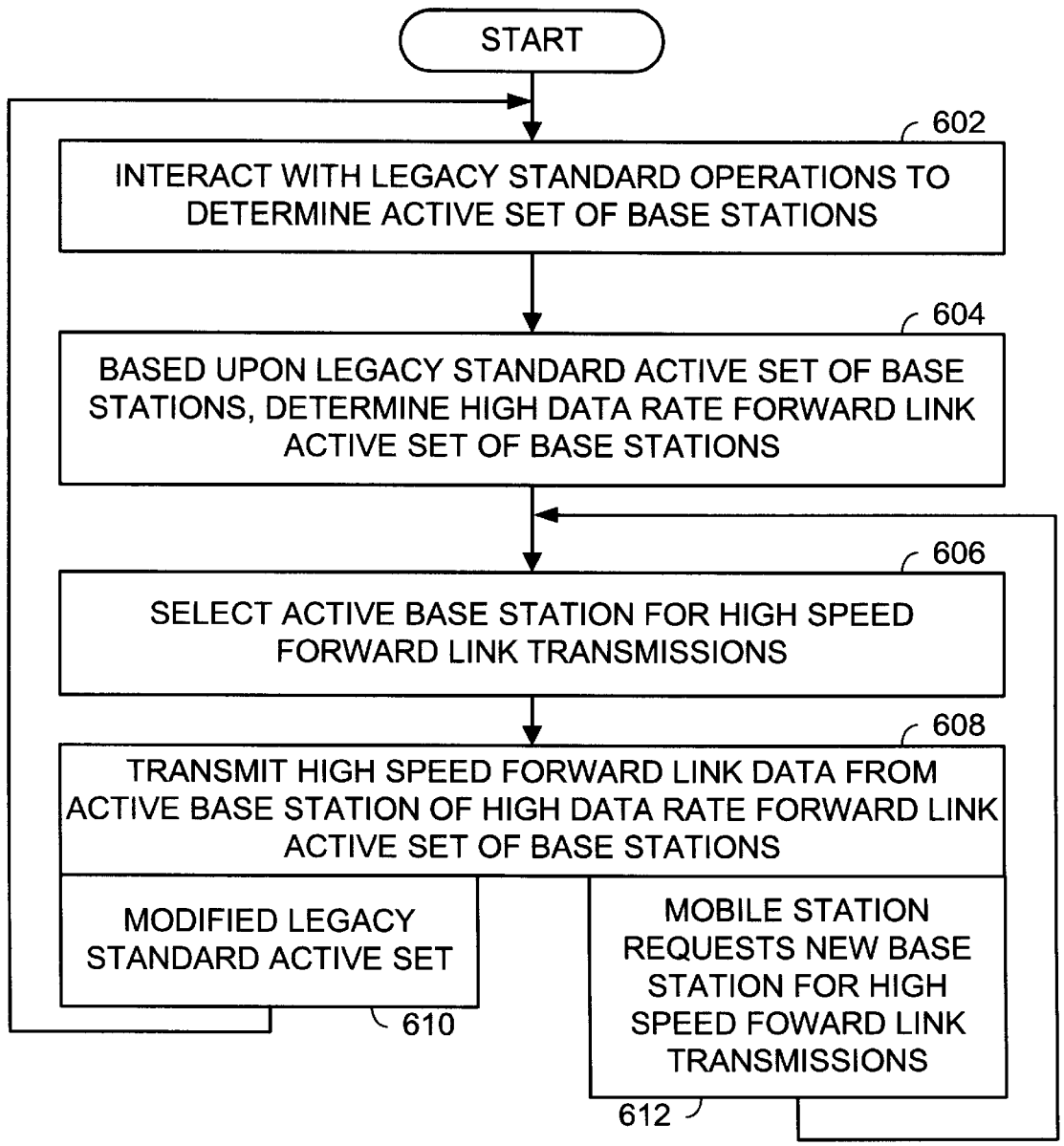
FIG. 6 is a logic diagram illustrating operation according to the present invention in determining a high data rate forward link active set of base stations.

FIG. 6 is a logic diagram illustrating operation according to the present invention in determining a high data rate forward link active set of base stations. Operation commences in FIG. 6 wherein the high data rate forward link operations interact with legacy standard operations to determine an active set of base stations defined by the legacy standard operations (step 602). As was previously described, this interaction is typically made via software instruction and data passing operations.

Then, based upon a legacy standard active set of base stations determine via the interaction, a high data rate forward link active set of base stations is determined (step 604). As was previously described, the high data rate forward link active set of base stations will include all or a portion of the active set of base stations that was defined by the legacy standard operations. Further, the high data rate forward link active set of base stations may correspond directly to a subset of such base stations, (e.g., reduced active set of base stations as defined in the CDMA 2000 standards).

With the high data rate forward link active set of base stations defined, the mobile station and the cellular wireless network interact to select a base station for high data rate forward link transmissions (step 606). With this base station selected, and with additional limitations as described with reference to FIGS. 7 and 8, the cellular wireless network initiates high data rate forward link data transmissions from the selected base station to the mobile station (step 608). Such transmissions continue from the selected base station until one of two steps occurs.

In a first step, the legacy standard operations may be modified (step 610). Upon the modification of the active set of base stations defined by legacy standard, operation returns to step 602 where the selection of a new high data rate forward link active set of base stations may be determined. During this operation, forward link transmissions from the active base station of the high data rate forward link active set of base stations will typically continue. Thus, the operations of step 602 through 606 will be performed along with the transmission of high data rate forward link data from the active base station to the mobile station.

As a second modification that may occur from step 608, the mobile station may request a new active base station for high data rate forward link transmissions (step 612). This selection will be made from the high data rate forward link active set of base stations. Further, the mobile station will make this request based upon the quality of transmissions that are supported by each of the base stations of the high data rate forward link active set of base stations. In one operation, the mobile station will monitor the carrier to interference ratio of pilot signals produced by each base station of the high data rate forward link active set of base stations. Upon the satisfaction of a threshold condition, the mobile station determines that the currently active base station does not perform as well as another of the base stations in its high data rate forward link active set. Thus, the mobile station requests via a reverse link channel that the active serving base station be altered in favor of a new serving base station. In such case, operation returns to step 606 where the new active base station is selected. The operations of FIG. 6 continue for a particular mobile station during the pendency of the high data rate forward link transmissions.

Figure 7:
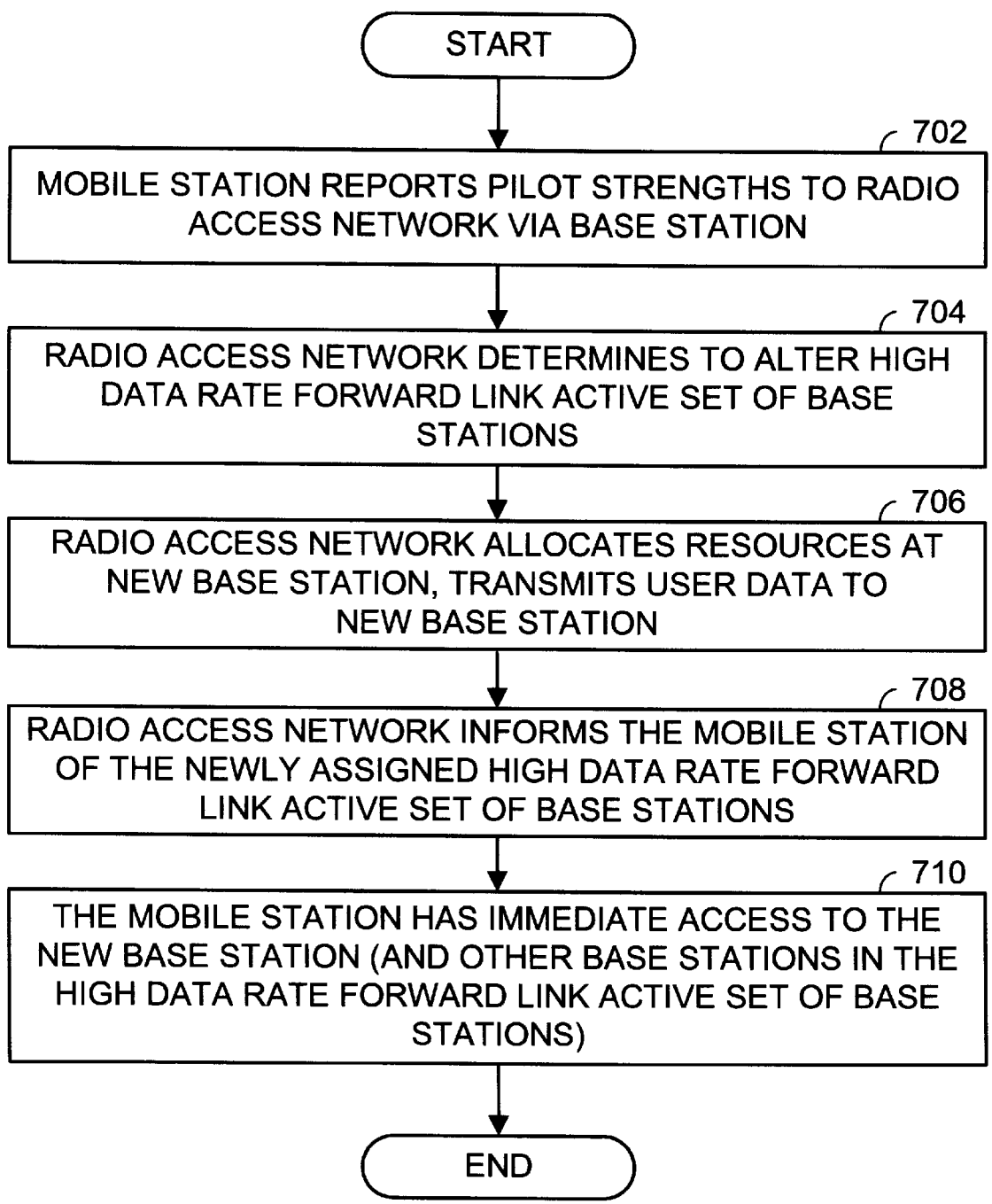
FIG. 7 is a logic diagram illustrating operation according to a first embodiment of the present invention in adding a base station to the high data rate forward link active set of base stations.

FIG. 7 is a logic diagram illustrating operation according to a first embodiment of the present invention in adding a base station to the high data rate forward link active set of base stations. According to legacy standard operations, a mobile station continually monitors the strength of pilot signals that it detects. Further, the mobile station reports pilot strengths of those detected pilot signals to a radio access network via its currently serving base station (step 702). This operation is generally known and is supported by the legacy standard. Based upon this reporting, the legacy standard operations may alter the active set of base stations provided for by the legacy standard operations. Further, according to the present invention, the high data rate forward link active set of base stations may be altered, whether or not the active set of base stations determined by the legacy standard operations is altered.

The radio access network then determines to alter the high data rate forward link active set of base stations (step 706). This alteration may correspond to a change in the reduced active set of base stations of the legacy standard operations, (e.g., change in reduced active set of base stations of the legacy standard operations). When this occurs, the radio access network allocates resources at the new base station and transmits user data to the new base station (step 706). The transmission of user data corresponds to packet data stored in the C-RLP transmit buffer of the base station controller to the D-RLP transmit buffer of the new base station. Further, resources at the new base station are allocated for high data rate forward link transmissions.

With the allocation of resources at the new base station completed and the transmit buffer of the D-RLP of the new base station updated, the radio access network then informs the mobile station of the newly assigned high data rate forward link active set of base stations (step 708). The mobile station then has immediate access to the new base station as well as to other base stations in the high data rate forward link active set of base stations (step 710). In this fashion, the newly added base station is not accessible until it is ready to begin transmitting on the forward link to the mobile station.

Figure 8:
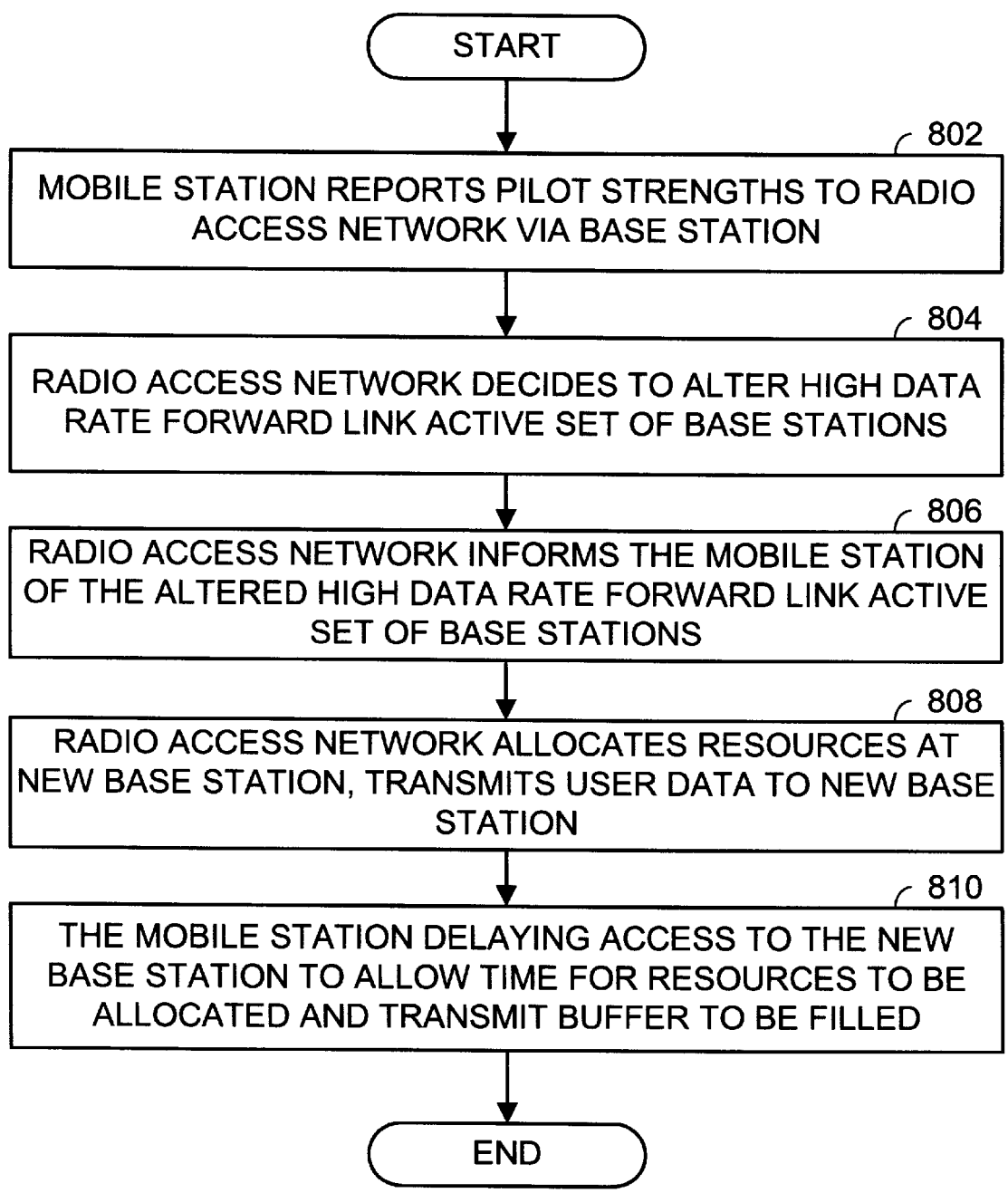
FIG. 8 is a logic diagram illustrating operation according to a second embodiment of the present invention in adding a base station to the high data rate forward link active set of base stations.

FIG. 8 is a logic diagram illustrating operation according to a second embodiment of the present invention in adding a base station to the high data rate forward link active set of base stations. As shown in step 802, the mobile station reports the strengths of received pilot signals to the radio access network via a serving base station (step 802). The radio access network then determines to alter the high data rate forward link active set of base stations based upon the received pilot signal strengths by the mobile station (step 804). The radio access network then informs the mobile station of the newly assigned high data rate forward link active set of base stations (step 806).

However, because the new base station of the high data rate forward link active set of base stations does not have resources allocated or have its D-RLP buffer filled, the newly added base station is not available for high data rate forward link transmissions. Thus, while the radio access network allocates resources at the new base station and starts transmitting user data to the new base stations (step 808), the mobile station delays access to the new base station to allow time for resources to be allocated and for the buffers to be filled (step 810). Thus, the mobile station will not request the new base station to transmit forward link high data rate data until the newly added base station is ready for such transmissions.

Figure 9:
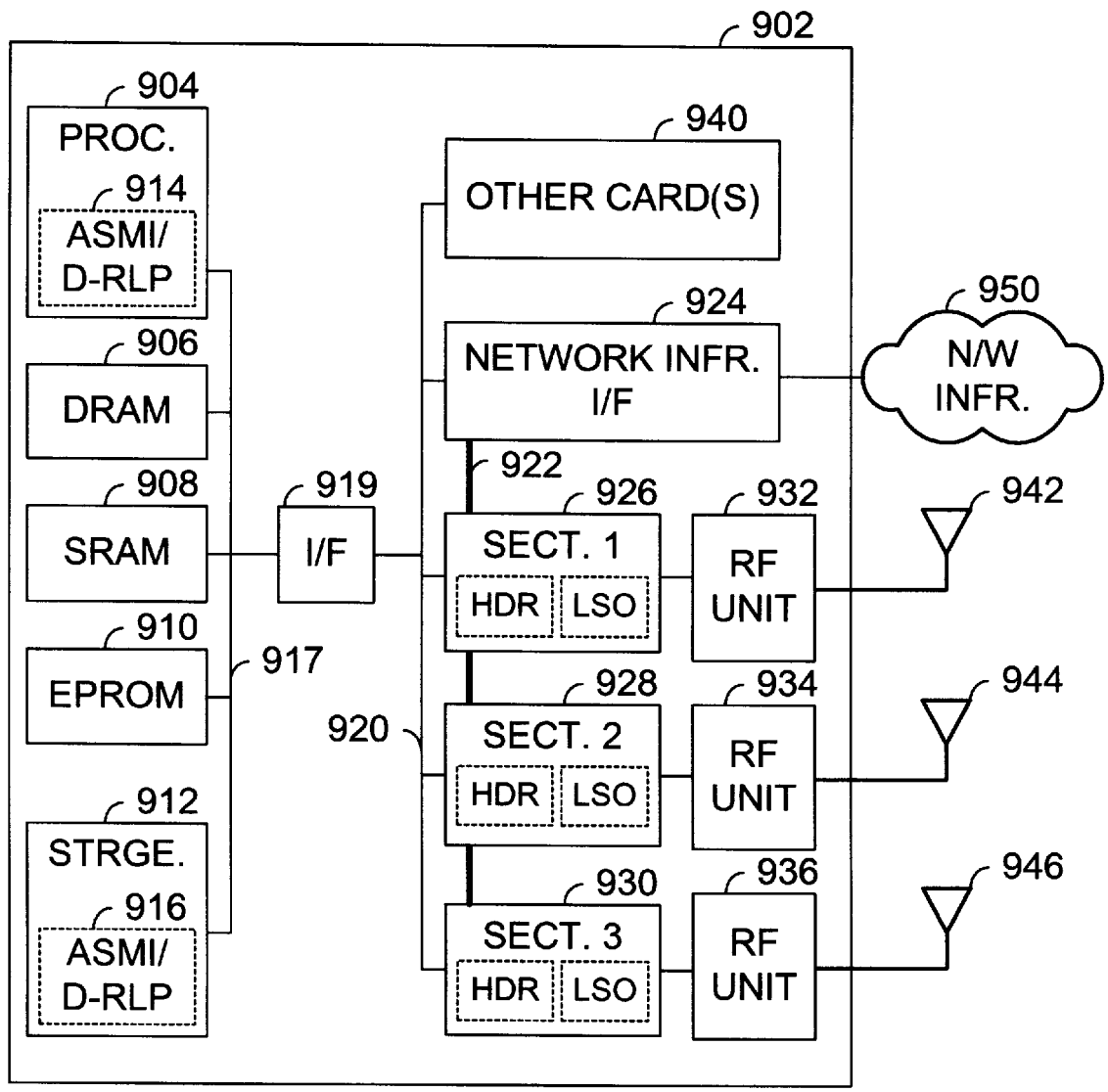
FIG. 9 is a block diagram illustrating a base station/base station transceiving subsystem constructed according to the present invention.

FIG. 9 is a block diagram illustrating a base station/BTS 902 constructed according to the present invention. The BTS 902 supports an operating protocol, e.g., IS-95A, IS-95B, IS-2000, GSM-EDGE, UMTS and/or various 3G and 4G standards that are compatible with the teachings of the present invention, with our without modification thereto. However, in other embodiments, the BTS 902 supports other operating standards. The BTS 902 supports protocol layer operations such as those described with reference to FIGS. 2, 3A, and/or 3B.

The BTS 902 includes a processor 904, dynamic RAM 906, static RAM 908, Flash memory, EPROM 910 and at least one data storage device 912, such as a hard drive, optical drive, tape drive, etc. These components (which may be contained on a peripheral processing card or module) intercouple via a local bus 917 and couple to a peripheral bus 920 (which may be a back plane) via an interface 918. Various peripheral cards couple to the peripheral bus 920. These peripheral cards include a network infrastructure interface card 924, which couples the BTS 902 to the wireless network infrastructure 950.

Digital processing cards 926, 928, and 930 couple to Radio Frequency (RF) units 932, 934, and 936, respectively. Each of these digital processing cards 926, 928, and 930 performs digital processing for a respective sector, e.g., sector 1, sector 2, or sector 3, serviced by the BTS 902. Thus, each of the digital processing cards 926, 928, and 930 will perform some or all of processing operations described with reference to FIGS. 6 and 7. The RF units 932, 934, and 936 couple to antennas 942, 944, and 946, respectively, and support wireless communication between the BTS 902 and mobile stations (the structure of which is shown in FIG. 9). The BTS 902 may include other cards 940 as well.

Active Set Management Instructions/D-RLP instructions (ASMI/D-RLP) 916 are stored in storage 912. The ASMI/D-RLP 916 are downloaded to the processor 904 and/or the DRAM 906 as ASMI/D-RLP 914 for execution by the processor 904. While the ASMI/D-RLP 916 are shown to reside within storage 912 contained in BTS 902, the ASMI/D-RLP 916 may be loaded onto portable media such as magnetic media, optical media, or electronic media. Further, the ASMI/D-RLP 916 may be electronically transmitted from one computer to another across a data communication path. These embodiments of the ASMI/D-RLP are all within the spirit and scope of the present invention.

Upon execution of the ASMI/D-RLP 914, the BTS 902 performs operations according to the present invention previously described herein with reference to FIGS. 1–8. The ASMI/D-RLP 916 may also be partially executed by the digital processing cards 926, 928, and 930 and/or other components of the BTS 902. Further, the structure of the BTS 902 illustrated is only one of many varied BTS structures that could be operated according to the teachings of the present invention.

Figure 10:
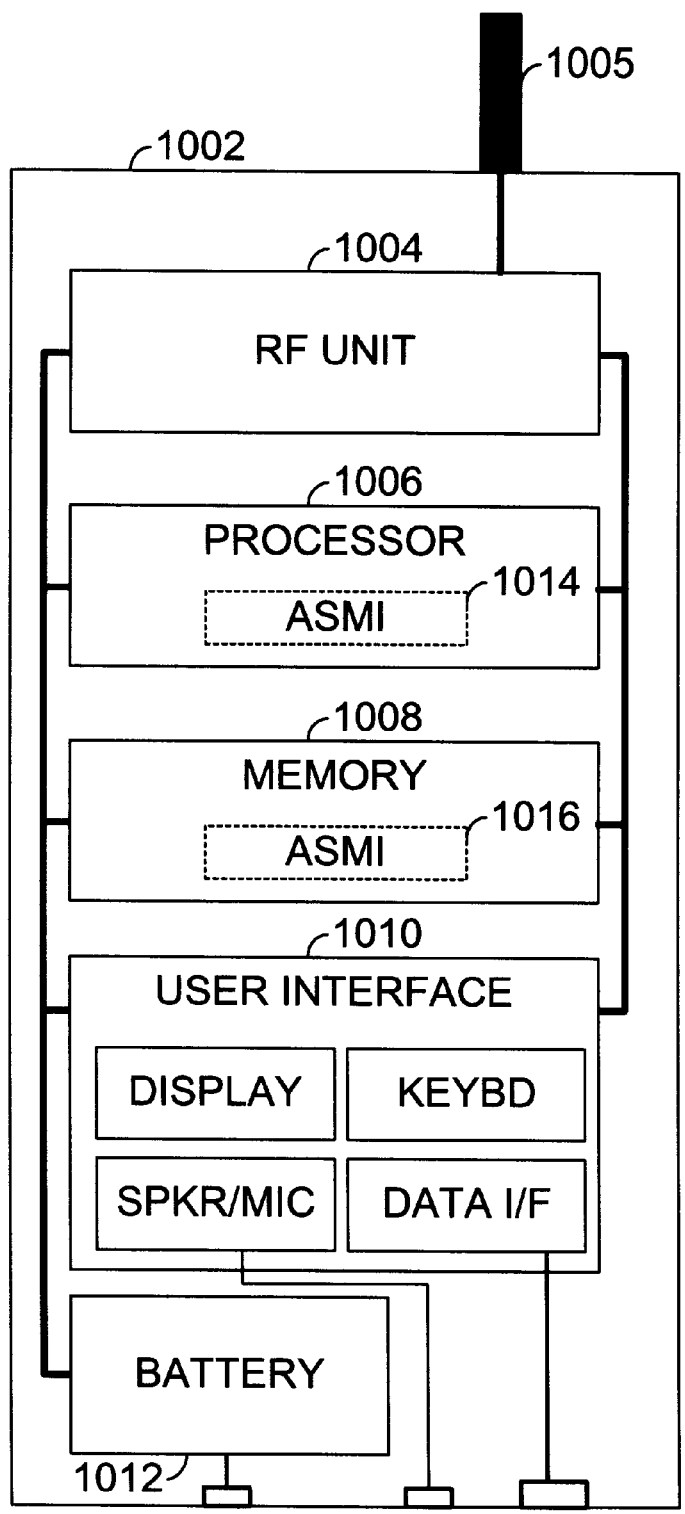
FIG. 10 is a block diagram illustrating a mobile station constructed according to the present invention.

FIG. 10 is a block diagram illustrating a mobile station 1002 constructed according to the present invention that performs the operations previously described herein. The mobile station 1002 supports a CDMA operating protocol, e.g., IS-95A, IS-95B, IS-2000, and/or various 3G and 4G standards that are compatible with the teachings of the present invention, with or without modification. However, in other embodiments, the mobile station 1002 supports other operating standards.

The mobile station 1002 includes an RF unit 1004, a processor 1006, and a memory 1008. The RF unit 1004 couples to an antenna 1005 that may be located internal or external to the case of the mobile station 1002. The processor 1006 may be an Application Specific Integrated Circuit (ASIC) or another type of processor that is capable of operating the mobile station 1002 according to the present invention. The memory 1008 includes both static and dynamic components, e.g., DRAM, SRAM, ROM, EEPROM, etc. In some embodiments, the memory 1008 may be partially or fully contained upon an ASIC that also includes the processor 1006. A user interface 1010 includes a display, a keyboard, a speaker, a microphone, and a data interface, and may include other user interface components. The RF unit 1004, the processor 1006, the memory 1008, and the user interface 1010 couple via one or more communication buses/links. A battery 1012 also couples to and powers the RF unit 1004, the processor 1006, the memory 1008, and the user interface 1010.

Active Set Management Instructions (ASMI) 1016 are stored in memory 1008. The ASMI 1016 are downloaded to the processor 1006 as ASMI 1014 for execution by the processor 1006. The ASMI 1016 may also be partially executed by the RF unit 1004 in some embodiments. The ASMI 1016 may be programmed into the mobile station 1002 at the time of manufacture, during a service provisioning operation, such as an over-the-air service provisioning operation, or during a parameter updating operation. Upon their execution, the ASMI 1014 cause the mobile station 1002 to perform operations according to the present invention previously described with reference to FIGS. 1–8.

The structure of the mobile station 1002 illustrated is only an example of one mobile station structure. Many other varied mobile station structures could be operated according to the teachings of the present invention. Upon execution of the ASMI 1014, the mobile station 1002 performs operations according to the present invention previously described herein in servicing a VOIP telephony call.

Figure 11:
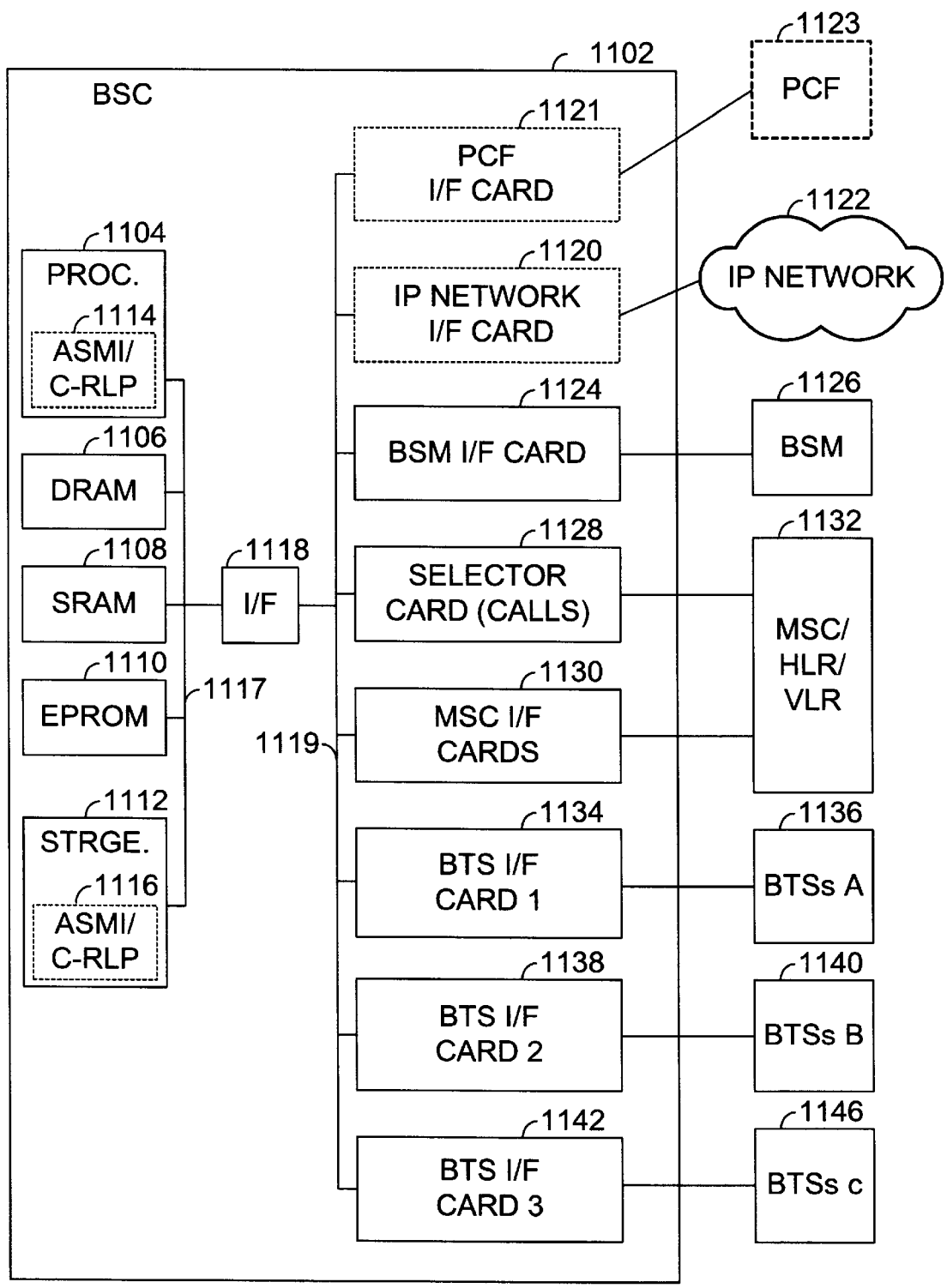
FIG. 11 is a block diagram illustrating a Base Station Controller (BSC) constructed according to the present invention.

FIG. 11 is a block diagram illustrating a Base Station Controller (BSC) 1102 constructed according to the present invention. The structure and operation of BSCs is generally known. The BSC 1102 services both circuit switched and packet switched operations. In some cases, the BSC 1102 is called upon to convert data between circuit switched and data switched formats, depending upon the types of equipment coupled to the BSC 1102. The components illustrated in FIG. 11, their function, and the interconnectivity may vary without departing from the teachings of the present invention.

The BSC 1102 includes a processor 1104, dynamic RAM 1106, static RAM 1108, EPROM 1110 and at least one data storage device 1112, such as a hard drive, optical drive, tape drive, etc. These components intercouple via a local bus 1117 and couple to a peripheral bus 1119 via an interface 1118. Various peripheral cards couple to the peripheral bus 1119. These peripheral cards include an IP network interface card 1120, a base station manager card 1124, at least one selector card 1128, a MSC interface card 1130, and a plurality of BTS interface cards 1134, 1138 and 1142.

The IP network interface card 1120 couples the BSC 1102 to an IP network 1122. The base station manager interface card 1124 couples the BSC 1102 to a Base Station Manager 1126. The selector card 1128 and MSC interface card 1130 couple the BSC 1102 to the MSC/HLR/VLR 1132. the BTS interface cards 1134, 1138, and 1142 couple the BSC 1102 to base stations served by Base station Transceiver Subsystems (BTSs) 1136, 1140, and 1146, respectively.

In another embodiment of the present invention, a packet control function (PCF) 1123 is implemented separately from the BSC 1102. In such case, the BSC 1102 couples to the PCF 1123 via a PCF I/F card 1121. However, some of the PCF operations may be performed by a PDSN described with reference to FIG. 12

Active Set Management Instructions/C-RLP instructions (ASMI/C-RLP), along with the BSC 1102 hardware, enable the BSC 1102 to perform the operations of the present invention. The ASMI/C-RLP 1116 are loaded into the storage unit 1112 and, upon their execution, some or all of the ASMI/C-RLP 1114 are loaded into the processor 1104 for execution. During this process, some of the ASMI/C-RLP 1116 may be loaded into the DRAM 1106.

Figure 12:
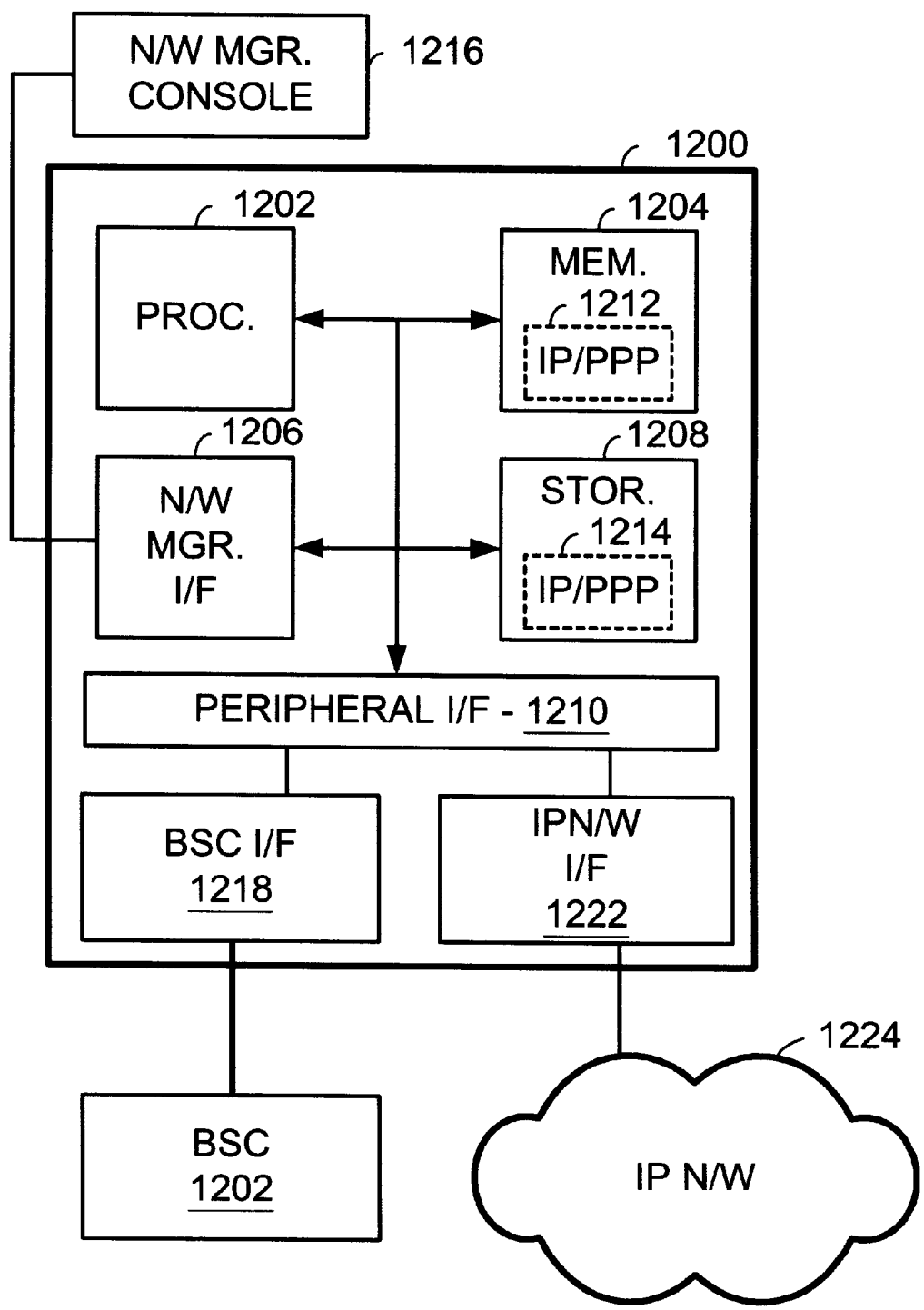
FIG. 12 is a block diagram illustrating a Packet Data Serving Node (PDSN) constructed according to the present invention.

FIG. 12 is a block diagram illustrating a Packet Data Serving Node (PDSN) 1200 constructed according to the present invention. The PDSN 1200 may be general-purpose computer that has been programmed and/or otherwise modified to perform the particular operations described herein. However, the PDSN 1200 may be specially constructed to perform the operations described herein. In particular, the PDSN 1200 may be the PDSN 114 shown in FIG. 1 or the PDSN 204 illustrated in FIG. 2 that executes some of the operations described with reference to FIGS. 3–4 and 8–11.

Apart from the functions of the present invention, the PDSN 1200 performs functions that are basically the same as those performed by the Network Access Server (NAS) in data networks. A NAS is the entry point to the network and provides the end user with access to network services. In a CDMA2000 system, the PDSN is the entry point to the public data network for MSs. The PDSN resides on the network edge and controls access to network services.

The PDSN 1200 includes a processor 1202, memory 1204, a network manager interface 1206, storage 1208, and a peripheral interface 1210, all of which couple via a processor bus. The processor 1202 may be a microprocessor or another type of processor that executes software instructions to accomplish programmed functions. The memory 1204 may include DRAM, SRAM, ROM, PROM, EPROM, EEPROM or another type of memory in which digital information may be stored. The storage 1208 may be magnetic disk storage, magnetic tape storage, optical storage, or any other type of device, which is capable of storing digital instructions and data.

The network manager interface 1206 couples to a network manager console 1216, which allows a network manager to interface with the PDSN 1200 via a network manager console 1216. The network manager console 1216 may be a keypad/display or may be a more complex device, such as a personal computer, which allows the manager to interface with the PDSN 1200. However, the network manager may interface with the PDSN 1200 using other techniques as well, e.g., via a card coupled to the peripheral interface 1210.

The peripheral interface 1210 couples to a BSC interface 1218 and to an IP network interface 1222. The BSC interface 1218 couples the PDSN 1200 to the BSC 1102. The IP network interface 1222 couples the PDSN 1200 to an IP network 1224, e.g., a combination of the Internet, Intranets, LANs, WANs, etc. The IP network 1224 is shown generally as the Internet 114 of FIG. 1 and the Packet Data Networks 206 of FIG. 2. The IP network 1224 may be either of these networks or another packet switched network.

IP/PPP protocol instructions (IP/PPP) 1212 are loaded into the storage 1208 of the PDSN 1200. Upon their execution, a portion of the IP/PPP 1212 is downloaded into memory 1204 (as IP/PPP 1214). The processor 1202 then executes the IP/PPP 1214 to perform the operations described herein performed by the PDSN 1200. The programming and operation of digital computers is generally known to perform such steps. Thus, the manner in which the processor 1202 and the other components of the PDSN 1200 function to perform these operations are not further described herein.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method for operating a cellular wireless network to service high data rate forward link transmissions for a mobile station, the method comprising:

interacting with legacy standard operations supported by the cellular wireless network to determine a legacy standard active set of base stations for the mobile station;

determining a high data rate forward link active set of base stations based upon the legacy standard active set of base stations;

transmitting blocks of packetized forward link data to the base stations of the high data rate forward link active set of base stations; and at any given time, transmitting high data rate forward link data from only one base station of the high data rate forward link active set of base stations.

2. The method of claim 1, wherein the high data rate forward link active set of base stations is a subset of the legacy standard active set of base stations for the mobile station.

3. The method of claim 1, wherein each of the legacy standard active set of base stations supports communications with the mobile station according to legacy standard operations.

4. The method of claim 1, wherein:
the legacy standard operations comprise code division multiple access operations; and
the high data rate forward link operates substantially according to a high data rate standard.

5. The method of claim 4, wherein:
the legacy standard comprises the 1xRTT standard; and
the high data rate forward link operates substantially according to the 1xEV-DO standard.

6. The method of claim 1, wherein:
the legacy standard active set of base stations for the mobile station is selected according to legacy standard criteria; and
the high data rate forward link active set of base stations is selected from the active set of base stations supporting legacy operations based upon high data rate forward link operation criteria.

7. The method of claim 6, wherein:
the legacy standard active set of base stations for the mobile station is selected based upon the strength of pilot signals received by the mobile station;
the high data rate forward link active set of base stations is selected based upon the carrier to interference ratio of each of the legacy standard active set of base stations for the mobile station.

8. The method of claim 6, wherein the high data rate forward link active set of base stations is also selected based upon the available high data rate forward link capacity available at each of the legacy standard active set of base stations for the mobile station.

9. A base station controller that services high data rate forward link transmissions for a mobile station, the base station controller comprising:
a data network interface that receives blocks of packetized forward link data intended for the mobile station;
a base station interface that interfaces the base station controller to a plurality of base stations; and
at least one digital processor coupled to the data network interface and the base station interface that executes software instructions causing the base station controller to:
interact with legacy standard operations supported by at least one component of the cellular wireless network to determine a legacy standard active set of base stations for the mobile station;
determine a high data rate forward link active set of base stations based upon the legacy standard active set of base stations; and
transmit the blocks of packetized forward link data to the base stations of the high data rate forward link active set of base stations; and
at any given time, supporting transmissions of high data rate forward link data from only one base station of the high data rate forward link active set of base stations.

10. The base station controller of claim 9, wherein the high data rate forward link active set of base stations is a subset of the legacy standard active set of base stations for the mobile station.

11. The base station controller of claim 9, wherein:
the legacy standard active set of base stations for the mobile station is selected based upon the strength of pilot signals received by the mobile station;
the high data rate forward link active set of base stations is selected based upon the carrier to interference ratio of each of the legacy standard active set of base stations for the mobile station.

12. The base station controller of claim 11, wherein the high data rate forward link active set of base stations is also selected based upon the available high data rate forward link capacity available at each of the legacy standard active set of base stations for the mobile station.

13. A method for operating a cellular wireless network to service high data rate forward link transmissions for a mobile station, the method comprising:
receiving packetized data intended for the mobile station;
determining an active set of base stations for servicing the mobile station, wherein any of the active set of base stations may be selected to transmit the packetized data to the mobile station;
initiating transmission of the packetized data to the mobile station via a first base station of the plurality of base stations of the active set of base stations;
adding a new base station to the active set of base stations; and
delaying the mobile station's access to the new base station to allow provisioning of resources at the new base station.

14. The method of claim 13, wherein in delaying access to the new base station, the method further comprises:
provisioning the resources at the new base station; and
notifying the mobile station that the new base station is in the active set of base stations after the provisioning of resources at the new base station is complete.

15. The method of claim 13, wherein in delaying access to the new base station, the method further comprises:
directing the mobile station to initiate a delay timer for a delay timer period such that it will not attempt to access the new base station until the delay timer has expired; and
after notifying the mobile station to initiate the delay timer, provisioning the resources at the new base station.

16. The method of claim 15, wherein the delay timer period is provided to the mobile station with the direction to initiate the delay timer.

17. The method of claim 15, wherein the delay timer period is provided to the mobile station during call setup.

18. The method of claim 15, wherein the delay timer period is provided to the mobile station in a broadcast message.

19. A base station controller that services high data rate forward link transmissions for a mobile station, the base station controller comprising:
a data network interface that receives packetized data intended for the mobile station;
a base station interface that interfaces the base station controller to a plurality of base stations; and
at least one digital processor coupled to the data network interface and the base station interface that executes software instructions causing the base station controller to:
determine an active set of base stations for servicing the mobile station, wherein any of the active set of base stations may be selected to transmit the packetized data to the mobile station;
initiate transmission of the packetized data to the mobile station via a first base station of the plurality of base stations of the active set of base stations;

adding a new base station to the active set of base stations; and delaying the mobile station's access to the new base station to allow provisioning of resources at the new base station.

20. The base station controller of claim 19, wherein in delaying access to the new base station, the base station controller:

provisions the resources at the new base station; and notifies the mobile station that the new base station is in the active set of base stations after the provisioning of resources at the new base station is complete.

21. The base station controller of claim 19, wherein in delaying access to the new base station, the base station controller:

directs the mobile station to initiate a delay timer for a delay timer period such that it will not attempt to access the new base station until the delay timer has expired; and after notifying the mobile station to initiate the delay timer, provisions the resources at the new base station.

* * * * *